US007345990B2

(12) United States Patent
Son

(10) Patent No.: US 7,345,990 B2
(45) Date of Patent: Mar. 18, 2008

(54) METHOD AND APPARATUS FOR PERFORMING DIGITAL COMMUNICATIONS

(75) Inventor: Jung-Min Son, Kyongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 1082 days.

(21) Appl. No.: 10/349,414

(22) Filed: Jan. 22, 2003

(65) Prior Publication Data

US 2003/0231581 A1   Dec. 18, 2003

(30) Foreign Application Priority Data

Jan. 23, 2002   (KR)   ............... 10-2002-0003901

(51) Int. Cl.
*H04J 11/00*   (2006.01)
(52) U.S. Cl. ............... 370/208; 370/210; 370/343
(58) Field of Classification Search ........... 370/208, 370/210, 230, 328, 329, 343, 203
See application file for complete search history.

(56) References Cited

U.S. PATENT DOCUMENTS

| 6,178,158 | B1 * | 1/2001 | Suzuki et al. | ............... | 370/203 |
| 6,314,146 | B1 * | 11/2001 | Tellado et al. | ............... | 375/346 |
| 2002/0075840 | A1 * | 6/2002 | Vadde | ............... | 370/343 |
| 2002/0150036 | A1 * | 10/2002 | Weerackody | ............... | 370/208 |
| 2002/0168016 | A1 * | 11/2002 | Wang et al. | ............... | 375/260 |
| 2002/0172184 | A1 * | 11/2002 | Kim et al. | ............... | 370/344 |

FOREIGN PATENT DOCUMENTS

| DE | 196 25 054 A1 | 6/1996 |
| WO | WO 98/10567 | 3/1998 |
| WO | WO 9810567 A1 * | 3/1998 |
| WO | WO 98/19410 | 5/2003 |

OTHER PUBLICATIONS

International Search Report dated May 2, 2003, issued in a counterpart application, namely, International Appln. No. PCT/KR03/00148.
A.D.S. Jayalath et al., "Peak-to-Average Power Ratio Reduction of an OFDM Signal Using Data Permutation with Embedded Side Information", May 6-9, 2001, vol. 4, pp. 562-565.
European Search Report dated May 27, 2003, issued in a counterpart application, namely, Appln. No. 03001338.7.
Leonard J. Cimini et al., "Peak-to-Average Power Ratio Reduction of an OFDM Signal Using Partial Transmit Sequences," IEEE Communications Letters, vol. 4, No. 3, Mar. 2000, pp. 86-88.

* cited by examiner

*Primary Examiner*—Kwang Bin Yao
*Assistant Examiner*—Andrew Lai
(74) *Attorney, Agent, or Firm*—The Farrell Law Firm, PC

(57) ABSTRACT

A wired and wireless communication method, and more particularly a method and apparatus for reducing a PAPR (Peak to Average Power Ratio) in an OFDM (Orthogonal Frequency Division Multiplexing) system. A transmitter of the OFDM system designates, as a coset leader, a vector capable of minimizing a PAPR in a general standard array of (n, k) linear block codes and transmits a sequence having a minimum PAPR by adding each coset leader to an n-bit codeword corresponding to k-bit information and producing U ($\leq 2^{n-k}$) number of vectors. Then, a receiver of the OFDM system can easily recover an original transmission signal using a syndrome of a received vector if the receiver identifies information of the syndrome and the coset leader. Subsequently, the OFDM system can be designed irrespective of the number of carriers, i.e., N, and enhance the system's performance by increasing a value of U. Moreover, the OFDM system different from the conventional SLM (Selective Mapping) system does not have to transmit, to the receiver, information indicating which signal has been selected.

14 Claims, 5 Drawing Sheets

| 1ST COSET | $e_1 = c_1 = 0$ | $c_2$ | $c_3$ | ... | $c_K$ |
|---|---|---|---|---|---|
| 2ND COSET | $e_2$ | $e_2 + c_2$ | $e_2 + c_3$ | ... | $e_2 + c_K$ |
| 3RD COSET | $e_3$ | $e_3 + c_2$ | $e_3 + c_3$ | ... | $e_3 + c_K$ |
| ... | ... | ... | ... | ... | ... |
| iTH COSET | $e_i$ | $e_j + c_2$ | $e_j + c_3$ | ... | $e_j + c_K$ |
| ... | ... | ... | ... | ... | ... |
| UTH COSET | $e_u$ | $e_u + c_2$ | $e_u + c_3$ | ... | $e_u + c_K$ |

FIG.3

METHOD AND APPARATUS FOR PERFORMING DIGITAL COMMUNICATIONS

PRIORITY

This application claims priority to an application entitled "METHOD AND APPARATUS FOR DIGITAL COMMUNICATIONS", filed in the Korean Industrial Property Office on Jan. 23, 2002 and assigned Serial No. 2002-3901, the contents of which are hereby incorporated by reference herein.

BACKGROUND OF THE INVENTION

1. Field of the Invention

The present invention relates to a wired and wireless communication method, and more particularly a method and apparatus for reducing a PAPR (Peak to Average Power Ratio) in an OFDM (Orthogonal Frequency Division Multiplexing) system.

2. Description of the Related Art

In a typical parallel data processing system, an entire signal frequency band is divided into N number of frequency sub-channels, which do not overlap one another. Respective symbols are modulated through the sub-channels, and frequency division multiplexing is applied to the N sub-channels.

FIG. 1 is a view illustrating a configuration of a conventional OFDM (Orthogonal Frequency Division Multiplexing) system. Referring to FIG. 1, the conventional OFDM system modulates and demodulates parallel data using DFT (Discrete Fourier Transform).

Hereinafter, the operation of the conventional OFDM system will be described with reference to FIG. 1. At first, if a serial data stream having a predetermined size (e.g. X bits) is inputted into a data converter 11, the data converter 11 converts the serial data stream into parallel data. At this time, it is assumed that each of the parallel data outputted to output ports of the data converter 11, consists of X bits. The parallel data, which consist of X bits, respectively, are inputted into a signal mapper 12, and the signal mapper 12 modulates the parallel data on the basis of a predetermined PSK (Phase-Shift Keying) or QAM (Quadrature Amplitude Modulation) scheme, etc. and then outputs a plurality of modulated symbol streams $d_0, d_1, \ldots, d_{n-1}$. Herein, n is related to what kind of dimension is used for the modulation scheme. If BPSK is used, "n" is equal to "X". If QPSK is used, "n" is equal to "X/2". If 16QAM is used, "n" is equal to "X/4". An IDFT (Inverse Discrete Fourier Transform) circuit 13 carries out IDFT for the modulated symbols $d_0, d_1, \ldots, d_{n-1}$ and then outputs parallel OFDM signals. The parallel OFDM signals are converted into a serial OFDM signals by a parallel to serial converter 14. The serial OFDM signals are inputted into a guard interval inserter 15. The guard interval inserter 15 inserts a guard interval into the serial OFDM signals and then outputs the serial OFDM signals having the guard interval to a D/A low pass filter (LPT) 16. The D/A LPT 16 converts a digital signal of the serial OFDM signals having the guard interval into an analog signal. The analog signal converted by the D/A LPT 16 is transmitted via a channel over air interface 17 via antenna. The channel refers to a data transmission channel for radio communications. Up to now, the operation of a transmitter of the OFDM communication system has been described.

The analog signal transmitted through the air interface 17 is inputted into an LPT A/D 18. The LPT A/D 18 converts the analog signal received from the channel 17 into a digital signal and then outputs the digital signal to a guard interval remover 19. The guard interval remover 19 removes the guard interval inserted into the digital signal and then outputs, to a serial to parallel converter 20, the digital signal from which the guard interval is removed. The serial to parallel converter 20 converts the digital signal from which the guard interval is removed, i.e., the serial OFDM signals, into parallel OFDM signals, and then outputs the parallel OFDM signals in a unit of $d_0, d_1, \ldots, d_{n-1}$ bits. The parallel OFDM signals are inputted into a DFT (Discrete Fourier Transform) circuit 21. The DFT circuit 21 carries out DFT for the parallel OFDM signals and then outputs Fourier Transformed symbols. The symbols are inputted into a signal demapper 22. The signal demapper 22 demodulates the symbols and then outputs the parallel data, X bits. The parallel data are inputted into a parallel to serial converter 23. The parallel to serial converter 23 converts the parallel data into one serial data stream and then outputs the serial data stream.

In an OFDM communication system using N number of carriers, it is assumed that a $k^{th}$ OFDM signal is represented as a modulated signal $A_{i,k}$ (i=0, 1, ..., N−1) allocated to an $i^{th}$ carrier in a given symbol duration T. Each modulated signal $A_{i,k}$ is one of the symbols in a constellation plot based on modulation. Using the modulated signal $A_{i,k}$, an envelope having a complex value of an OFDM baseband signal is as follows.

$$s(t) = \sum_{k=-\infty}^{\infty} \sum_{i=0}^{N-1} A_{i,k} \cdot g(t-kT) \cdot e^{j2\pi i t/T} \qquad \text{[Equation 1]}$$

In the above Equation 1, g(t) denotes a rectangular pulse having width T, and T denotes an OFDM symbol duration. To maintain the orthogonality between OFDM carriers, an $i^{th}$ carrier frequency $f_i$ can be represented as the following Equation 2 in terms of a center frequency $f_c$.

$$f_i = f_c + i\Delta f \qquad \text{[Equation 2]}$$

In the above Equation 2, $\Delta f$ means a bandwidth of one carrier, and is an integral multiple of an OFDM symbol rate 1/T.

Looking into several prominent characteristics of the OFDM system, when the OFDM system is compared with a single carrier system identical with the OFDM system in a transmission bandwidth and data transmission rate, a duration of one symbol to be transmitted in the OFDM system is approximately a multiple N of the duration of one symbol to be transmitted in the single carrier system, in the case where data to be transmitted is distributed on N carriers. As a result, the duration of one symbol in the OFDM system is longer than that of one symbol in the single carrier system. In addition, if a guard interval is added in a time domain, the degradation of transmission characteristics due to delay becomes less even though the number of multiple paths is increased.

Further, since data distributed on the entire transmission band is transmitted, an interference signal affects only a portion of the data in the case where the interference signal exists in a specific frequency band, and the OFDM system can efficiently improve its performance using an interleaver and an error correcting code.

Conventionally, in a multi-carrier transmission method, the peak envelope power of a multi-carrier signal increases in proportion to the number of carriers. If N signals in the OFDM system overlap in the same phase, the peak envelope power increases by a multiple of N of the average power. A PAPR is referred to as a peak to average power ratio of a multi-carrier signal. If the PAPR increases, A/D (Analog/Digital) or D/A (Digital/Analog) conversion is complicated and the efficiency of an RF (Radio Frequency) power amplifier is reduced.

Thus, research to reduce the PAPR is actively conducted and reducing the PAPR is one of problems to be necessarily addressed in order to efficiently implement the OFDM system having superior performance in RF and optical communications.

Where a symbol sequence of $\{A_0, A_1, \ldots, A_{N-1}\}$ having complex values is transmitted through N number of carriers, an OFDM baseband signal s(t) is represented as the following Equation 3 with respect to time $t \in [0, T]$.

$$s(t) = \sum_{i=0}^{N-1} A_i e^{j2\pi f_i t} \quad \text{[Equation 3]}$$

A PAPR of the OFDM baseband signal s(t) is defined by the following Equation 4.

$PAPR(s)$=Maximum instantaneous power of $s(t)$/
Average power of $s(t)$ [Equation 4]

Referring to the above Equation 4, where $A_i$ is an MPSK (Multiple Phase-Shift Keying) modulated symbol and the average power has a value of N, the maximum instantaneous power can have a value of $N^2$ and the PAPR has a value of N.

Thus, if an OFDM signal is generated using a symbol sequence, it has very high maximum instantaneous power and a high PAPR. Since IDFT (Inverse Discrete Fourier Transform) and DFT are used for modulation and demodulation in the OFDM system, baseband OFDM symbols in an arbitrary symbol duration are represented as N number of sample values and hence the baseband OFDM symbols can be represented as follows.

$$s[n] = IDFT(A) = \frac{1}{\sqrt{N}} \sum_{i=o}^{N-1} A_i e^{j2\pi \frac{in}{N}}, n = 0, 1, \ldots, N-1 \quad \text{[Equation 5]}$$

As defined in the above Equation 5, L*N-point IDFT is considered to produce the PAPR. L is an over sampling factor. If a sequence of N modulated inputs is $A=\{A_0, A_1, \ldots, A_{N-1}\}$, a sequence $A=\{A_0, A_1, \ldots, A_{LN-1}\}=\{A_0, A_1, \ldots, A_{N-1}, 0, 0, \ldots, 0\}$ including (L−1)N number of 0's is considered to take the LN-point IDFT. After taking the L*N-point IDFT of the sequence A in one symbol duration using the sequence A, an $n^{th}$ sample is represented as follows.

$$s[n] = \sum_{i=o}^{LN-1} A_i' e^{j2\pi \frac{in}{LN}}, n = 0, 1, \ldots, LN-1$$

Because the calculation of the PAPR with respect to continuous signals is complicated, the PAPR is calculated by considering only LN samples of OFDM signals associated with the sequence A. That is, the PAPR considering LN-point IDFT samples of the sequence A is defined as follows.

$$PAPR_{LN}(A) = \max_{n=0,1,\ldots,LN-1} \frac{|s[n]|^2}{E[|s[n]|^2]} \quad \text{[Equation 6]}$$

As defined in the above Equation 6, s[n] is a sample by the LN-point IDFT, and L denotes an oversampling factor. Further, E is an operator taking the mean of values of OFDM signal s[n] for all n. The case of L=1 is referred to as Nyquist sampling. It is well known that the PAPR can be sufficiently obtained if the oversampling factor L is 4, in order to obtain the PAPR shown in the above Equation 5 being a function of actually continuous time.

Several methods for reducing the PAPR in the OFDM communication system have been suggested. In a simplest method for reducing the PAPR, signal clipping is considered to limit a maximum size of a signal to a predetermined size or less.

The conventional clipping is the simplest method for reducing the PAPR, but has several problems. At first, the clipping causes amplitude of an OFDM signal to be distorted, and hence self-interference is generated to increase a BER (Bit Error Rate). Further, because the distortion of the OFDM signal is non-linear, it causes out-of-band frequency characteristics to be degraded.

On the other hand, in another method for reducing the PAPR in the OFDM system, a Golay sequence becomes an important factor in reducing the PAPR in the OFDM system. Where only the Golay sequence is used, there is an advantage in that a value of the PAPR is limited to 2 (3 dB). However, there is a disadvantage in that a code rate is rapidly reduced as the number of carriers increases.

A conventional error-correcting code technique can be used to reduce the PAPR in the OFDM system. In the conventional technique, only a codeword having peak envelope power of a small value is selected such that an OFDM signal can be generated to reduce the entire PAPR. However, there is a problem in that a code rate is greatly reduced as the number of carrier signals increases.

There is SLM (Selective Mapping) as another conventional technique. A basic concept of the SLM is to generate a plurality of OFDM signals indicating the same information. That is, the SLM generates U number of sequences indicating the same information and transmits a sequence having a smallest PAPR among the U sequences.

FIG. 2 is a view illustrating a structure of a conventional OFDM system based on the SLM. If an input sequence is denoted A, U number of independent sequences with the above-described input sequence are generated by multiplying a sequence of $P^{(u)}$ by the input sequence A, where u=1, 2, ..., U. As a result, U number of sequences $a^{(u)}$ for u=1, 2, ..., U in a time domain are produced by the IDFT of each sequence $A^{(u)}$.

Hereinafter, the operation of a transmitter of the conventional SLM-based OFDM system will be described with reference to FIG. 2. At first, a serial data stream A having n number of digital value (1 or −1) from a data source 31 is inputted into a serial to parallel converter 32. The serial to parallel converter 32 converts the serial data stream into parallel data (n)and then outputs the parallel data. Each of the parallel data is inputted into a corresponding one of multipliers 33-1, 33-2, . . . , 33-U. Each of the multipliers 33-1, 33-2, . . . , 33-U multiply the parallel data (n)by an external input sequence element by element, respectively. The first multiplier 33-1 multiplies, element by element, the parallel data (n) by a first sequence $P^{(1)}$ having "n" number of elements and then outputs a sequence $A^{(1)}$ having "n" number of elements. The second multiplier 33-2 multiplies, element by element, the parallel data (n) by a second sequence $P^{(2)}$ having "n" number of elements and then outputs a sequence $A^{(2)}$ having "n" number of elements. The $U^{th}$ multiplier 33-U multiplies, element by element, the parallel data (n) by a $U^{th}$ sequence $P^{(U)}$ having "n" number of elements and then outputs a sequence $A^{(U)}$ having "n" number of elements. The operations of the third to $(U-1)^{th}$ multipliers are similar with those of the above-described multipliers. The sequences $A^{(1)}, A^{(2)}, \ldots, A^{(U)}$ outputted from the multipliers 33-1, 33-2, . . . , 33-U are inputted into a corresponding one of U IDFT circuits 34-1, 34-2, . . . , 34-U, respectively. The IDFT circuits 34-1, 34-2, . . . , 34-U carry out IDFT for sequences $A^{(1)}, A^{(2)}, \ldots, A^{(U)}$ and then outputs IDFT signals, i.e., sequences $a^{(1)}, a^{(2)}, \ldots, a^{(U)}$ in a time domain. The sequences $a^{(1)}, a^{(2)}, \ldots, a^{(U)}$ in the time domain are inputted into a selector 35. The selector calculates PAPRs for the sequences $a^{(1)}, a^{(2)}, \ldots, a^{(U)}$ and then selects a PAPR having the smallest value among the calculated PAPRs. If the PAPR having the smallest value is selected, an IDFT signal stream having the selected PAPR is outputted as a final transmission signal $_a{}^{(u)}$. Simultaneously, side information is transmitted along with the IDFT signal stream having the selected PAPR.

The U number of sequences $a^{(u)}$ for u=1, 2, . . . , U in the time domain produced by the IDFT of each sequence $A^{(u)}$ is given by Eq. 7:

$$_a{}^{(u)}=IDFT\{_A{}^{(u)}\}, u=1,2, \ldots, U \quad [\text{Equation 7}]$$

All sequences $a^{(1)}$ to $a^{(u)}$ including the same information A, and a signal to be actually transmitted among the sequences $a^{(1)}$ to $a^{(u)}$ has the smallest PAPR value.

Theoretically, as the number of independent sequences, i.e., a value of U, increases, the characteristic of the PAPR becomes better. However, if the value of U increases, the complexity of the system increases.

Also, there is another significant disadvantage. Side information must be transmitted from a transmitter to a receiver because the receiver must identify which sequence is actually used at the transmitter among U number of sequence to recover original information. Moreover, if the side information have an error during transmission, a burst error can be caused, thereby greatly degrading the system's performance. Thus, the side information should be highly protected during transmission.

There is a PTS (Partial Transmit Sequence) method as another conventional technique. The conventional PTS method divides an input sequence into M number of independent and partial blocks and then shifts a phase of each partial block, thereby generating a plurality of sequences and reducing the PAPR. Side information associated with the phase shift should also be transmitted such that a receiver can recover original information.

SUMMARY OF THE INVENTION

Therefore, the present invention has been made in view of the above problems, and it is an object of the present invention to provide an OFDM (Orthogonal Frequency Division Multiplexing) communication method and apparatus capable of reducing a PAPR (Peak to Average Power Ratio) without affecting the efficiency of information transmission.

It is another object of the present invention to provide an OFDM (Orthogonal Frequency Division Multiplexing) communication method and apparatus capable of reducing a PAPR (Peak to Average Power Ratio) irrespective of the number of carriers without transmitting additional side information.

In accordance with an aspect of the present invention, the above and other objects can be accomplished by the provision of an OFDM (Orthogonal Frequency Division Multiplexing) transmitter, comprising: an (n, k) linear block encoder for outputting an n-bits codeword $c=(c_0, c_1, \ldots, c_{n-1})$ when a k-bits information block $d=(d_0, d_1, \ldots, d_{k-1})$ is inputted; U number of adders for generating signals $a_1, a_2, \ldots, a_U$ ($U \leq 2^{n-k}$) by performing bit-wise modulo-2 addition of a set of coset leaders $e_1, e_2, \ldots, e_U$ and the codeword c, the coset leaders associated with different syndromes being selected in relation to a parity-check matrix H for an (n, k) code; U number of m-ary signal mappers each mapping an output of a respective adder to a signal symbol in a unit of m bits and then generating a discrete signal $x_i$ consisting of N number of symbols; U number of LN-point IDFT (Inverse Discrete Fourier transform) circuits each transforming the discrete signal $x_i$ from a respective m-ary signal mapper into a discrete signal $y_i$ consisting of LN number of samples in a time domain, L being an oversampling factor; and a peak detector for searching for a signal $y_j$ having a smallest maximum value among the LN number of samples to detect a signal having minimum peak power among U number of discrete signals $y_1, y_2, \ldots, y_U$ from the LN-point IDFT circuits.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a table illustrating a standard array of (n, k) block codes in accordance with the present invention.

DETAILED DESCRIPTION OF THE PREFERRED EMBODIMENTS

Now, a technique for reducing a PAPR (Peak to Average Power Ratio) in accordance with the present invention will be described in detail with reference to FIGS. 3, 4A and 4B.

FIG. 3 is a table illustrating a standard array of (n, k) block codes in accordance with the present invention. Herein, $c_i$ is the codeword of (n,k) block code. The $c_i$ vector has a length n. First, the standard array of linear block codes based on a method for reducing the PAPR in accordance with the present invention will be described in detail.

If noise on a channel is indicated as e when a codeword c of (n, k) linear block codes is transmitted, a received vector is defined as r=c+e or $r_i=c_i+e_i$ at i=1, 2, ..., n. If H is an (n-k) x n parity-check matrix, then $Hc^t=0$, where t is a transposed matrix. The syndrome s of the received vector r is defined as follows.

$$s = (s_1, s_2, \ldots, s_{n-k})^t = Hr^t$$ [Equation 8]
$$= H(c+e)^t = Hc^t + He^t$$
$$= He^t$$

The syndrome is affected by an error caused on a channel rather than by the transmitted codeword. If e+C={x/x=e+c, c∈C} denotes a coset of a code C with a vector e, the syndrome of a vector x belonging to the coset e+C is as follows.

$$Hx^t = H(e+c)^t = He^t$$ [Equation 9]

Thus, all vectors within the coset e+C have syndromes related to the vector e.

The simplest method for decoding a block code is to use the standard array. Referring to FIG. 3, a form of an error predicted to be most frequently caused in each coset e+C in the standard array is defined as a coset leader. That is, a vector having the smallest weight in the coset e+C becomes the coset leader. Thus, if $e_u$ is set as the coset leader within the coset e+C, then $e_u$+C=e+C.

According to a method for generating a general standard array, the standard array of (n, k) block codes is generated as shown in FIG. 3. At this time, the number of vectors, which consist of n bits, respectively, is $2^n$, and the number of codewords, i.e., $2^k$ is defined as K. Thus, the number of cosets is $2^n/2^k=2^{n-k}$. In FIG. 3, $e_u$ at u=1, 2, ..., U becomes a leader of each coset.

Because a vector within the coset can be selected as a corresponding coset leader, a vector for minimizing the PAPR within the coset is designated as a coset leader. On the basis of the coset leader, the PAPR can be reduced using the generated standard array.

In a preferred embodiment of the present invention, where a codeword corresponding to information to be transmitted is $c_i$, U number of vectors of the coset of $c_i+e_u$ at u=1, 2, ..., U are generated using previously designated coset leaders $e_u$ at u=1, 2, ..., U, and a vector having a smallest PAPR among the vectors is transmitted. Thus, if a receiver identifies information related to a syndrome and a coset leader, an original transmission signal $c_i$ can be simply recovered using only a syndrome of a received vector.

Figure 1:
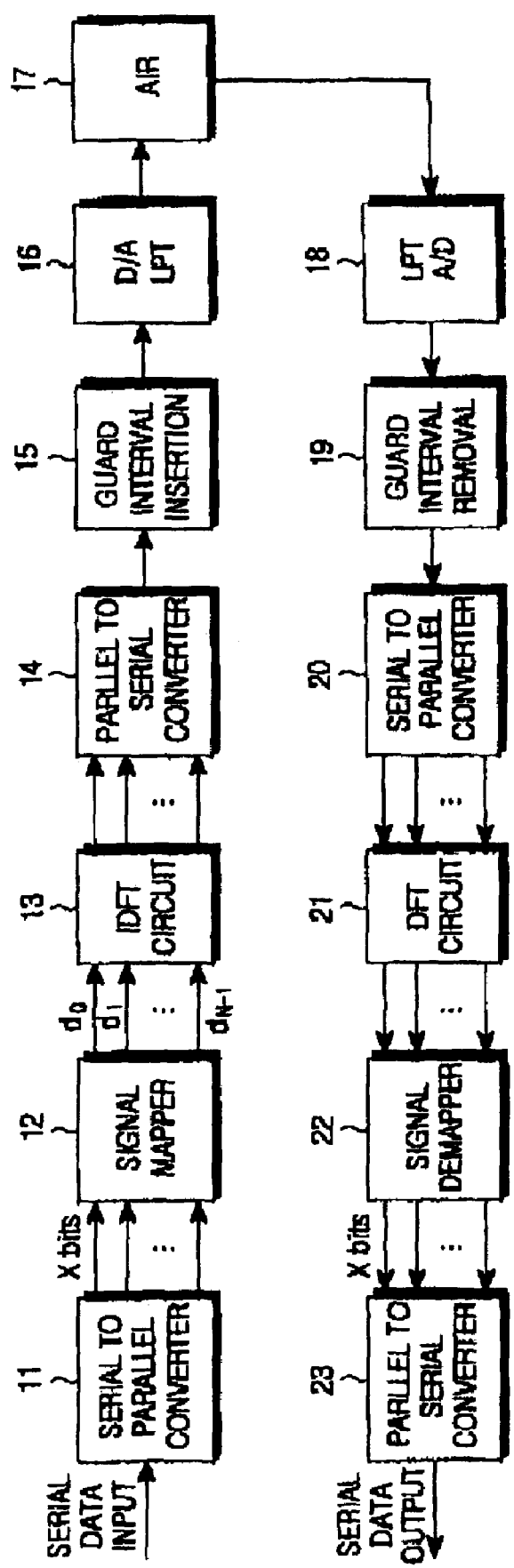
FIG. 1 is a view illustrating a configuration of a conventional OFDM (Orthogonal Frequency Division Multiplexing) system.
Figure 2:
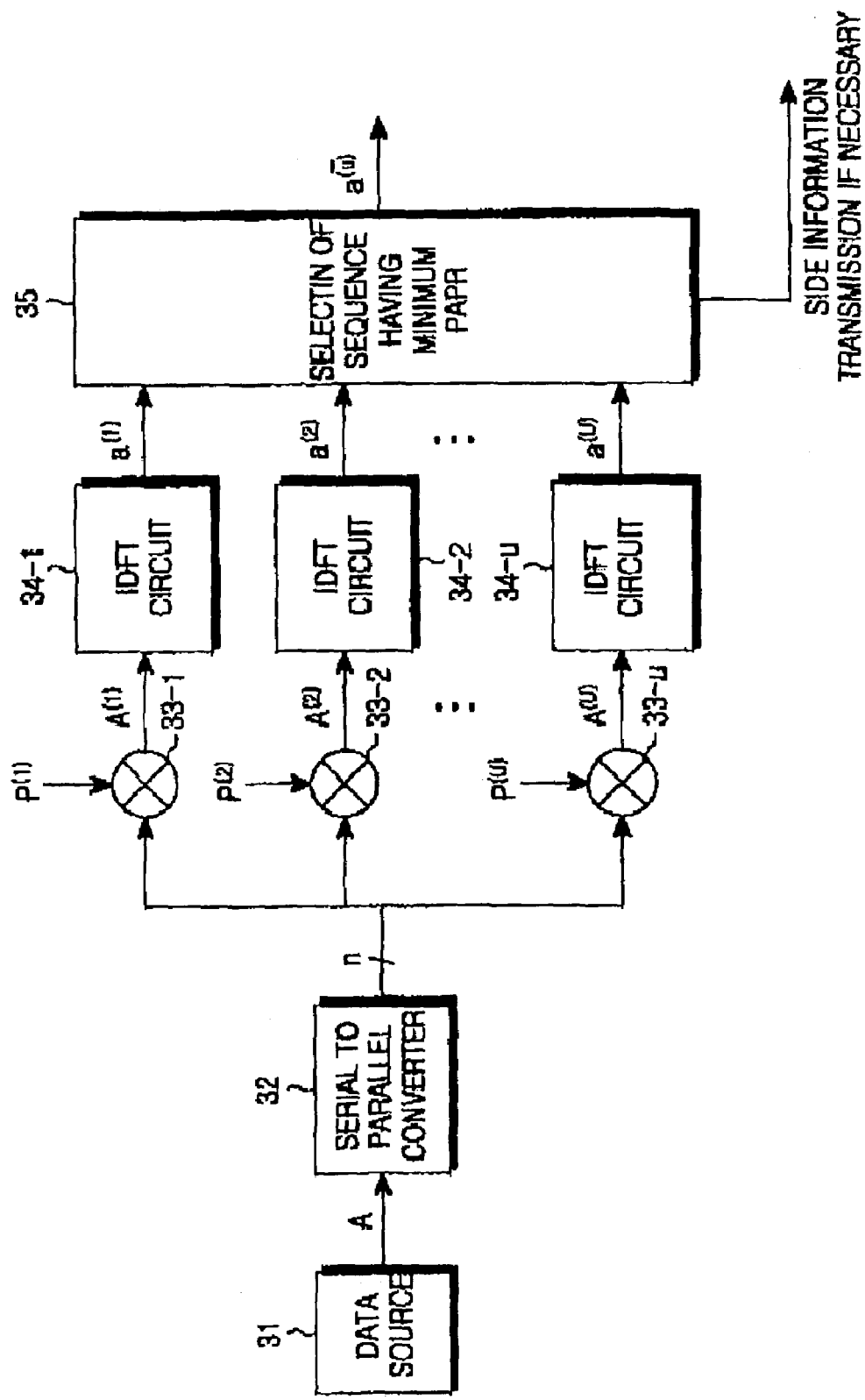
FIG. 2 a view illustrating a structure of a conventional OFDM system based on SLM (Selective Mapping)
Figure 4A:
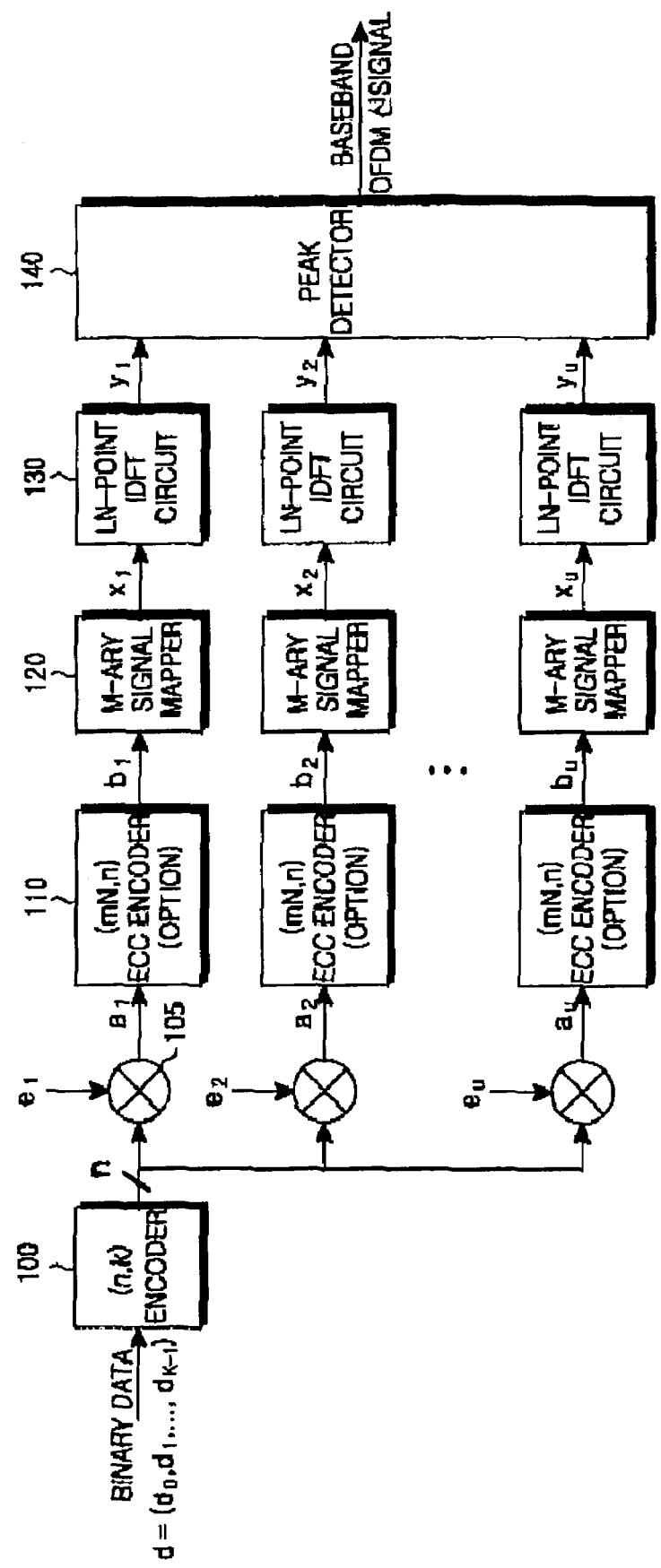
FIGS. 4A and 4B are views illustrating an OFDM system using a method for reducing a PAPR (Peak to Average Power Ratio) on the basis of a standard array of linear block codes in accordance with preferred embodiments of the present invention.
Figure 4B:
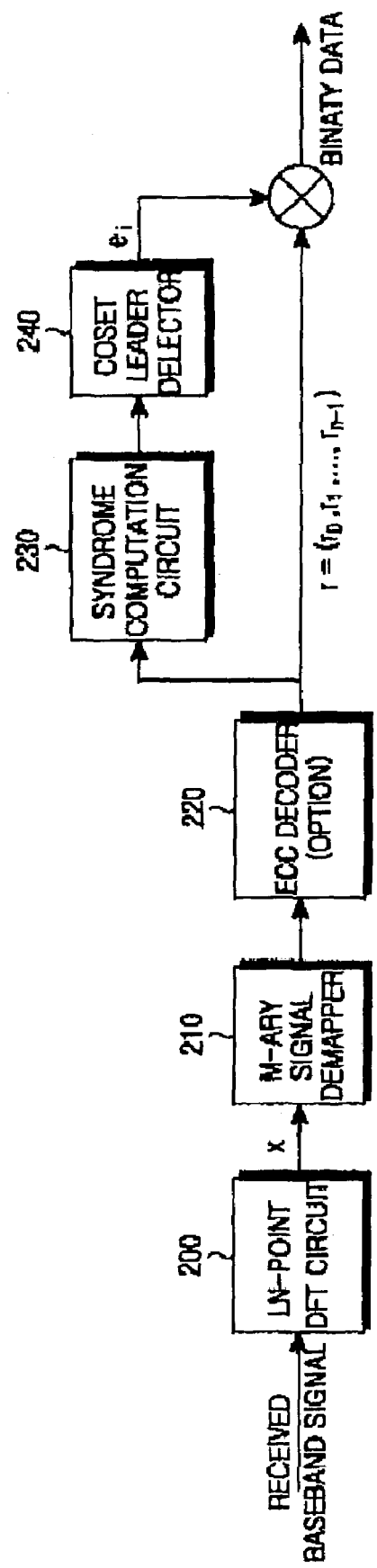

FIGS. 4A and 4B are views illustrating an OFDM system using a method for reducing the PAPR on the basis of a standard array of linear block codes in preferred embodiments of the present invention. FIG. 4A shows an OFDM transmitter. The transmitter produces the PAPR using LN-point IDFT to decide a sequence to be transmitted among U number of sequences and then N number of samples in the sequence having the minimum PAPR corresponding to a result of the IDFT are transmitted as baseband OFDM symbols. If a vector to be transmitted denotes $c_i$ and a coset leader used in a signal having a minimum PAPR denotes $e_u$, a related equation is as follows.

$$\tilde{u} = \arg\min_{1 \le u \le U} PAPR_{LN}(c_i + e_u)$$ [Equation 10]

Referring to FIG. 4A, if a k-bit information block d=($d_0$, $d_1$, ..., $d_{k-1}$) is inputted into an (n, k) encoder 100, it outputs an n-bit codeword c=($c_0$, $c_1$, ..., $c_{n-1}$).

Then, coset leaders 105, i.e., $e_1$, $e_2$, ..., $e_U$ have different syndromes in relation to a parity-check matrix H for an (n, k) code, and the coset leaders are stored in a receiver and transmitter to be used later on or in syndrome computation. Signals $a_1$, $a_2$, ..., $a_U$ are generated by bit-wise modulo-2 addition of the coset leaders and the codeword c, wherein $U \le 2^{n-k}$. The (n, k) code has error correcting capability by maintaining a value of U smaller than a value of $2^{n-k}$ and restrictedly selecting coset leaders $e_1$, $e_2$, ..., $e_U$.

In the preferred embodiment of the present invention, ECC (error-correcting code) encoders 110 can be optionally used to appropriately correct an error on a channel. In this case, if each n-bit signal $a_i$ is inputted into a respective (mN, n) ECC encoder 110, an mN-bit output $b_i$ is generated. Where the ECC is not used, relationships of $b_i=a_i$ and n=mN are satisfied.

On the other hand, the mN-bit output $b_i$ is inputted into an m-ary signal mapper 120 and then a discrete signal $x_i$ consisting of N number of symbols is produced, wherein each symbol corresponds to m bits. Then, the discrete signal $x_i$ consisting of the N symbols is converted to a discrete signal $y_i$ consisting of LN number of samples in a time domain by an LN-point IDFT circuit 130, wherein L is an oversampling factor.

Peak detector 140 detects a signal having minimum peak power among U number of discrete signals $y_1$, $y_2$, ..., $y_U$ by finding a signal $y_j$ having a smallest maximum value among LN number of samples. The discrete signal $x_j$ corresponding to a signal $y_j$ is applied to N-point IDFT, the discrete signal $x_j$ applied to the N-point IDFT is filtered by a low frequency band-pass filter, and then an OFDM signal for the information block d=($d_0$, $d_1$, ..., $d_{k-1}$) is produced.

Hereinafter, an operation of an OFDM receiver in accordance with the present invention will be described with reference to FIG. 4B. A signal produced by sampling a received baseband OFDM signal is converted to a signal x=($x_0$, $x_1$, ..., $x_{N-1}$) configured by N number of samples in a frequency domain by an N-point DFT (Discrete Fourier Transform) circuit 200. Then, the signal x is applied to an m-ary signal demapper 210, the signal x applied to the m-ary signal demapper 210 is decoded by an ECC decoder 220, and then an n-bit binary vector r=($r_0$, $r_1$, ..., $r_{n-1}$) is produced. A syndrome computation circuit 230 computes a syndrome of the vector r and then a coset leader selector 240 selects a coset leader $e_i$ corresponding to the computed syndrome.

Finally, an n-bit codeword c is produced by correcting the coset leader $e_i$ associated with the vector r by the equation c=r-$e_i$. The k-bit information block d is obtained from the codeword c. In other words, the receiver can produce a syndrome of a received signal to determine a coset leader used upon transmitting, and then produce an original transmission vector by adding the coset leader to the received vector.

Side information associated with a transmitted signal must be sent to the receiver in the conventional SLM, while additional side information does not have to be transmitted to a receiver if the receiver identifies only information of a coset leader using a standard array in accordance with the present invention. While the efficiency of a frequency is slightly degraded in the above-described two methods, where the standard array in accordance with the present invention is used, the reduction of the frequency efficiency can be compensated to some degree by using a block linear code with a high code rate.

Features and advantages of the present invention have been broadly disclosed such that the following claims of the present invention can be better understood. Other features and advantages configuring the following claims of the present invention will be described in detail. Those skilled in the art will appreciate that the idea and specific embodiments of the present invention described above can be implemented by a design or modification of another structure for accomplishing an object similar to the present invention's object.

Further, those skilled in the art will appreciate that the idea and specific embodiments of the present invention described above can be implemented by a design or modification of another structure in order to accomplish an object identical to the present invention's object. Although the preferred embodiments of the present invention have been disclosed for illustrative purposes, those skilled in the art will appreciate that various modifications, additions and substitutions are possible, without departing from the scope of the invention. Accordingly, the present invention is not limited to the above-described embodiments, but the present invention is defined by the claims which follow, along with their full scope of equivalents.

As apparent from the above-description, a transmitter designates, as a coset leader, a vector capable of minimizing a PAPR (Peak to Average Power Ratio) in a general standard array and transmits a sequence having a minimum PAPR on the basis of the coset leader in accordance with the present invention. In accordance with the present invention, a receiver can simply recover an original transmission signal using a syndrome of a received vector if the receiver identifies information of the syndrome and the coset leader.

In accordance with the present invention, an OFDM (Orthogonal Frequency Division Multiplexing) system can be designed irrespective of the number of carriers, i.e., N, and enhance the system's performance by increasing a value of U ($\leq 2^{n-k}$). Moreover, the OFDM system in accordance with the present invention is superior to the conventional SLM (Selective Mapping) technique because it does not have to transmit information indicating which signal has been selected.

What is claimed is:

1. An OFDM (Orthogonal Frequency Division Multiplexing) transmitter, comprising:
    an (n, k) linear block encoder for outputting an n-bit codeword $c=(c_0, c_1, \ldots, c_{n-1})$ when a k-bit information block $d=(d_0, d_1, \ldots, d_{k-1})$ is inputted wherein n is an integer greater than or equal to 1 and k is an integer less than or equal to n;
    U number of adders for generating signals $a_1, a_2, \ldots, a_U$ by performing bit-wise modulo-2 addition of a set of coset leaders $e_1, e_2, \ldots, e_U$ and the codeword c, the coset leaders associated with different syndromes being selected in relation to a parity-check matrix H for an (n, k) code;
    U number of m-ary signal mappers each mapping an output of a respective adder to a signal symbol in a unit of m bits and then generating a discrete signal $x_i$ consisting of N number of symbols, wherein m is an integer greater than or equal to 2, i=1 to U, and N is set such that n=mN is satisfied;
    U number of LN-point IDFT (Inverse Discrete Fourier transform) circuits each transforming the discrete signal $x_i$ from a respective m-ary signal mapper into a discrete signal $y_i$ consisting of LN number of samples in a time domain, L being an oversampling factor, wherein L is an integer greater than or equal to 1; and
    a peak detector for searching for a signal $y_j$ having a smallest maximum value among the LN number of samples to detect a signal having minimum peak power among U number of discrete signals $y_1, y_2, \ldots, y_U$ from the LN-point IDFT circuits.

2. The OFDM transmitter as set forth in claim 1, further comprising:
    an N-point IDFT circuit for applying a signal $x_j$ to IDFT, where $x_j$ corresponds to the signal $Y_j$ searched for by the peak detector; and
    a low frequency band-pass filter for filtering an output of the N-point IDFT circuit and then producing an OFDM signal for an information block $d=(d_0, d_1, \ldots, d_{k-1})$.

3. The OFDM transmitter as set forth in claim 1, further comprising:
    ECC (Error-Correcting code) encoders arranged between the adders and the m-ary signal mappers, each ECC encoder generating an mN-bit output b1 in response to an n-bit output $a_i$ of each adder.

4. A method for encoding an OFDM (Orthogonal Frequency Division Multiplexing) signal in an OFDM system for dividing an entire signal frequency band into N number of sub-channels which do not overlap and performing frequency division multiplexing, comprising the steps of:
    (a) allowing an (n, k) linear block encoder to output an n-bit codeword $c=(c_0, c_1, \ldots, c_{n-1})$ in response to a k-bit information block $d=(d_0, d_1, \ldots, d_{k-1})$ is input, wherein n is an integer greater than or equal to 1 and k is an integer less than or equal to n;
    (b) selecting the coset leaders associated with different syndromes in relation to a parity-check matrix H for an (n, k) code, performing bit-wise modulo-2 addition of coset leaders $e_1, e_2, \ldots, e_U$ and the codeword c, and generating signals $a_1, a_2, \ldots, a_U$ (U $\leq 2^{n-k}$);
    (c) inputting n-bit signals $a_1, a_2, \ldots, a_U$ into respective m-ary signal mappers, mapping each of the signals $a_1, a_2, \ldots, a_U$ to a signal symbol in a unit of m bits, and then generating discrete signals $x_i$, for each $a_i$, i=1 to U, each discrete signal $x_i$, consisting of N number of symbols, wherein m is an integer greater than or equal to 2, and N is set such that n=mN is satisfied;
    (d) transforming each discrete signal $x_i$, into a discrete signal $y_i$ consisting of LN number of samples in a time domain, L being an oversampling factor, wherein L is an integer greater than or equal to 1; and
    (e) searching for a signal $y_j$ among the $y_i$ signals having a smallest maximum value among LN number of samples to detect a signal having minimum peak power among U number of discrete signals $y_1, y_2, \ldots, y_U$, applying a discrete signal $x_j$ corresponding to the signal $y_j$ to N-point IDFT (Inverse Discrete Fourier transform), and then producing an OFDM signal for an information block $d=(d_0, d_1, \ldots, d_{k-1})$.

5. The method as set forth in claim 4, wherein the step (e) further comprises the step of:
    after applying the discrete signal $x_j$ corresponding to the signal $y_j$ to the N-point IDFT, performing low frequency band-pass filtering.

6. The method as set forth in claim 4, further comprising the step of:
    after the step (b), inputting n-bit signals $a_i$ into respective (mN, n) ECC (Error-Correcting code) encoders, generating mN-bit outputs $b_i$, and then inputting the mN-bit outputs $b_i$ into respective m-ary signal mappers contained in the step (c).

7. A method for providing coded bit streams to a plurality of IDFT (Inverse Discrete Fourier transform) circuits in an OFDM (Orthogonal Frequency Division Multiplexing) transmitter including an encoder for outputting a stream of n bits coded by encoding a binary data k-bit stream on the basis of a predetermined code rate (k/n), wherein n is an integer greater than or equal to 1 and k is an integer less than or equal to n, the IDFT (Inverse Discrete Fourier transform) circuits for outputting OFDM modulation symbol streams corresponding to the coded bit stream, and a peak detector for selecting and outputting a modulation symbol stream having minimum peak power among the modulation symbol streams outputted from the IDFT circuits, the method comprising the steps of:

selecting one of vectors within each of U cosets as a coset leader, a standard array of the coded bits being represented as U number of cosets, wherein a value of the U is less than or equal to $2^{n-k}$;

carrying out a bit-wise modulo-2 operation of the coded bit stream and each selected coset leader and then outputting U number of coded bit streams having different syndromes; and producing U number of discrete signal streams by carrying out symbol mapping for each of the U coded bit streams in a predetermined unit of bits and providing each of the discrete signal streams to a corresponding one of the IDFT circuits, the discrete signal stream consisting of a plurality of symbols.

8. The method as set forth in claim 7, wherein a vector to be selected as the coset leader is a form of an error predicted to be most frequently caused during transmission.

9. The method as set forth in claim 7, wherein a vector to be selected as the coset leader is for minimizing a PAPR (Peak to Average Power Ratio) among vectors within the coset.

10. The method as set forth in claim 7, wherein a vector to be selected as the coset leader has a smallest weight among vectors within the coset.

11. An apparatus for providing coded bit streams to a plurality of IDFT (Inverse Discrete Fourier transform) circuits in an OFDM (Orthogonal Frequency Division Multiplexing) transmitter including an encoder for outputting a stream of n bits coded by encoding a binary data k-bit stream on the basis of a predetermined code rate (k/n), wherein n is an integer greater than or equal to 1 and k is an integer less than or equal to n, the IDFT (Inverse Discrete Fourier transform) circuits for outputting OFDM modulation symbol streams corresponding to the coded bit stream, and a peak detector for selecting and outputting a modulation symbol stream having minimum peak power among the modulation symbol streams outputted from the IDFT circuits, the apparatus comprising:

adders for receiving coset leaders of vectors selected one by one from vectors within each of cosets corresponding to a standard array of the coded bits, carrying out a bit-wise modulo-2 operation of the coded bit stream and each coset leader, and outputting U number of coded bit streams having different syndromes, wherein a value of the U is less than or equal to $2^{n-k}$ and mappers for producing U number of discrete signal streams by carrying out symbol mapping for each of the U coded bit streams in a predetermined unit of bits and providing each of the discrete signal streams to a corresponding one of the IDFT circuits, the discrete signal stream consisting of a plurality of symbols.

12. The apparatus as set forth in claim 11, wherein a vector to be selected as the coset leader is a form of an error predicted to be most frequently caused during transmission.

13. The apparatus as set forth in claim 11, wherein a vector to be selected as the coset leader is for minimizing a PAPR (Peak to Average Power Ratio) among vectors within the coset.

14. The apparatus as set forth in claim 11, wherein a vector to be selected as the coset leader has a smallest weight among vectors within the coset.

* * * * *

UNITED STATES PATENT AND TRADEMARK OFFICE
CERTIFICATE OF CORRECTION

PATENT NO.       : 7,345,990 B2
APPLICATION NO.  : 10/349414
DATED            : March 18, 2008
INVENTOR(S)      : Jung-Min Son Page 1 of 1

It is certified that error appears in the above-identified patent and that said Letters Patent is hereby corrected as shown below:

Title page, (57) Abstract, Line 10, "≦" should be --≤--

Signed and Sealed this

Fifth Day of August, 2008

JON W. DUDAS
*Director of the United States Patent and Trademark Office*